UNITED STATES PATENT OFFICE.

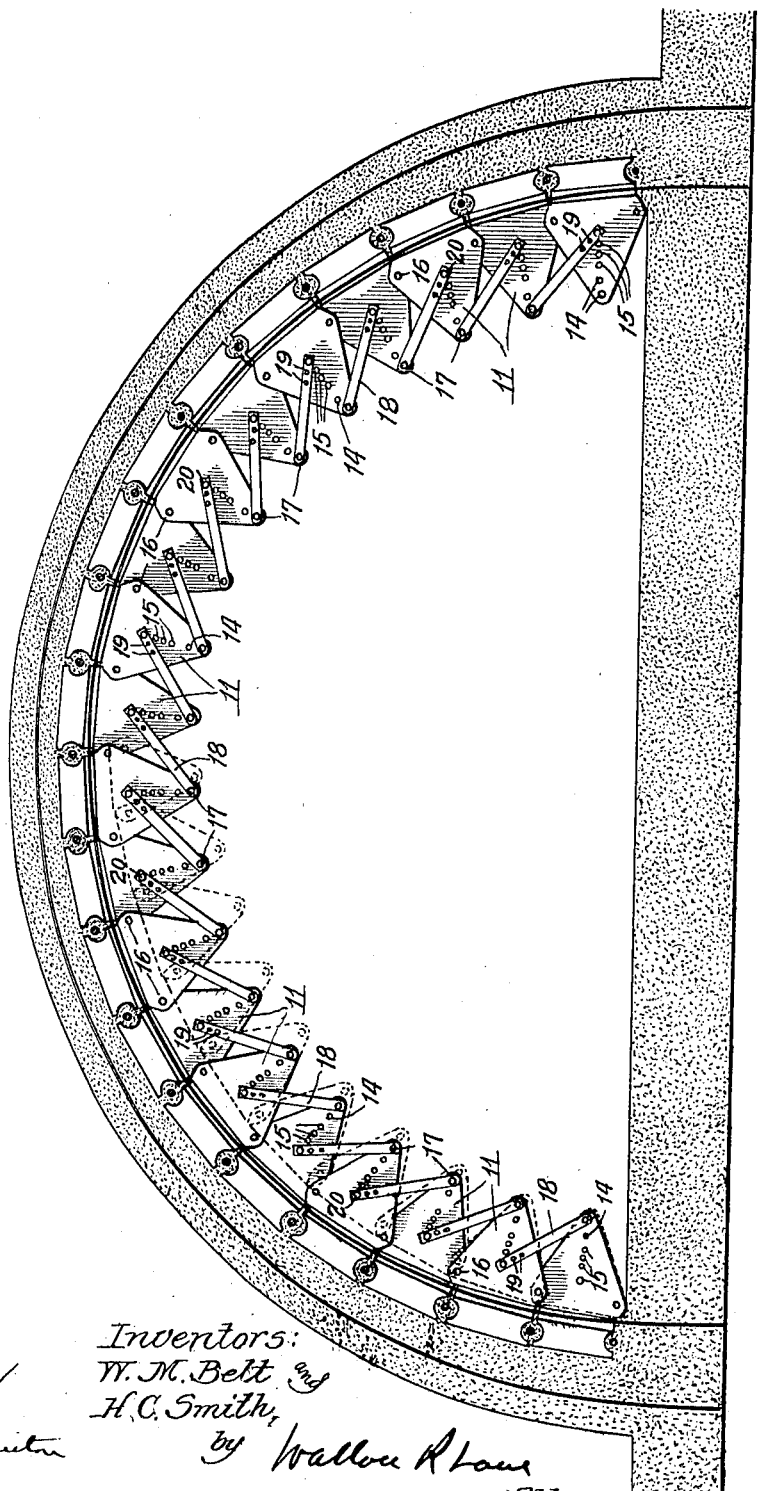

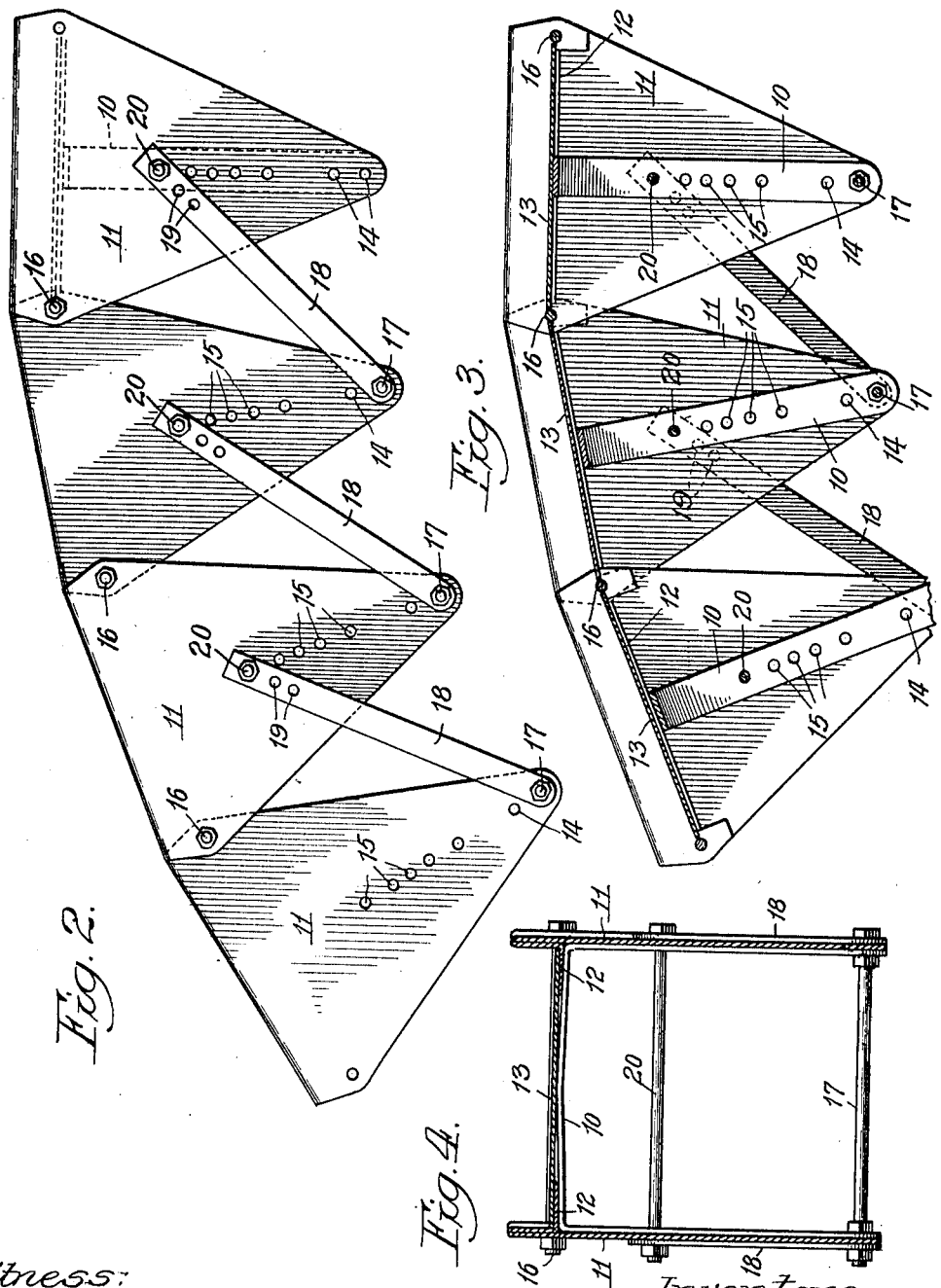

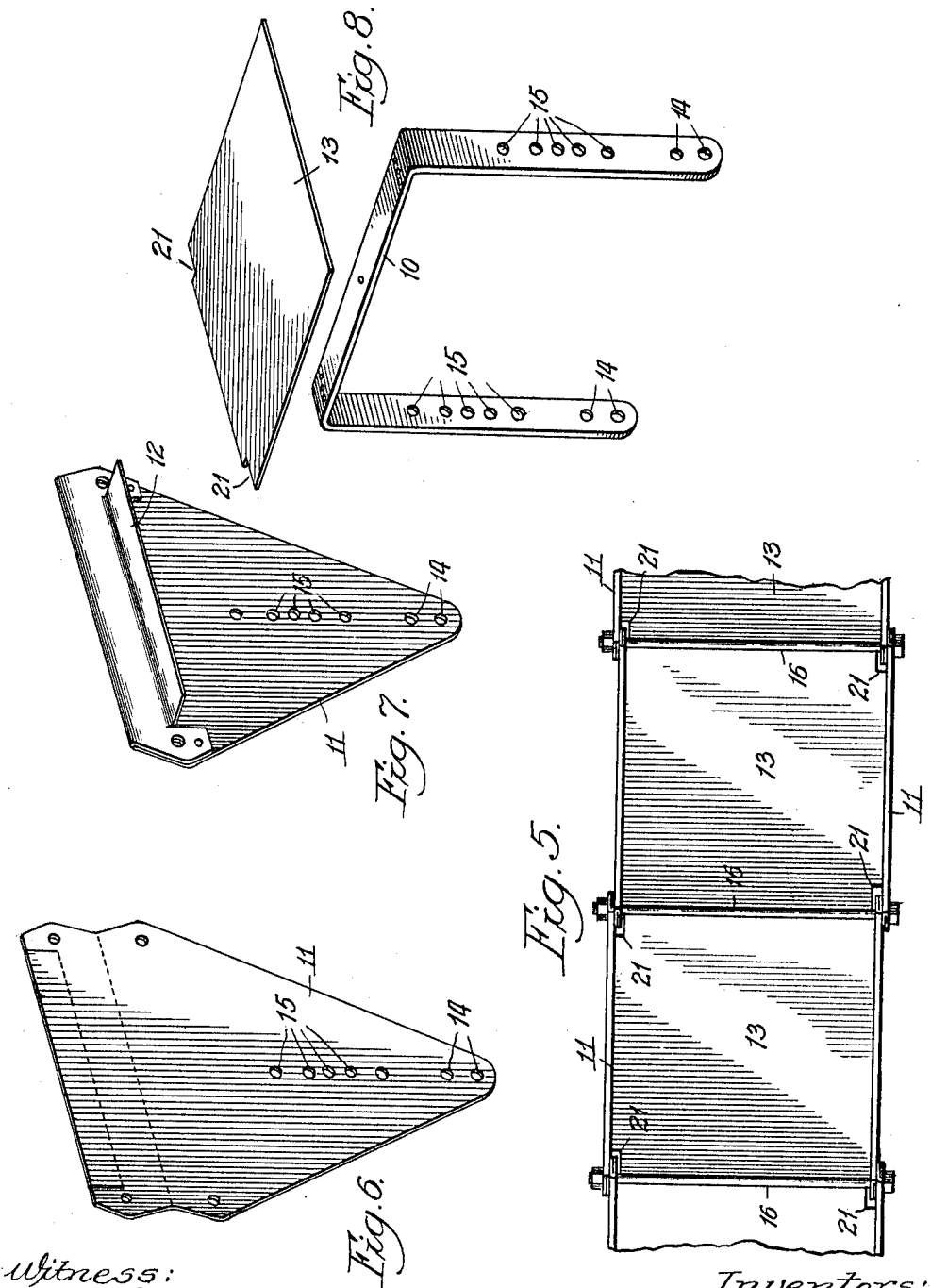

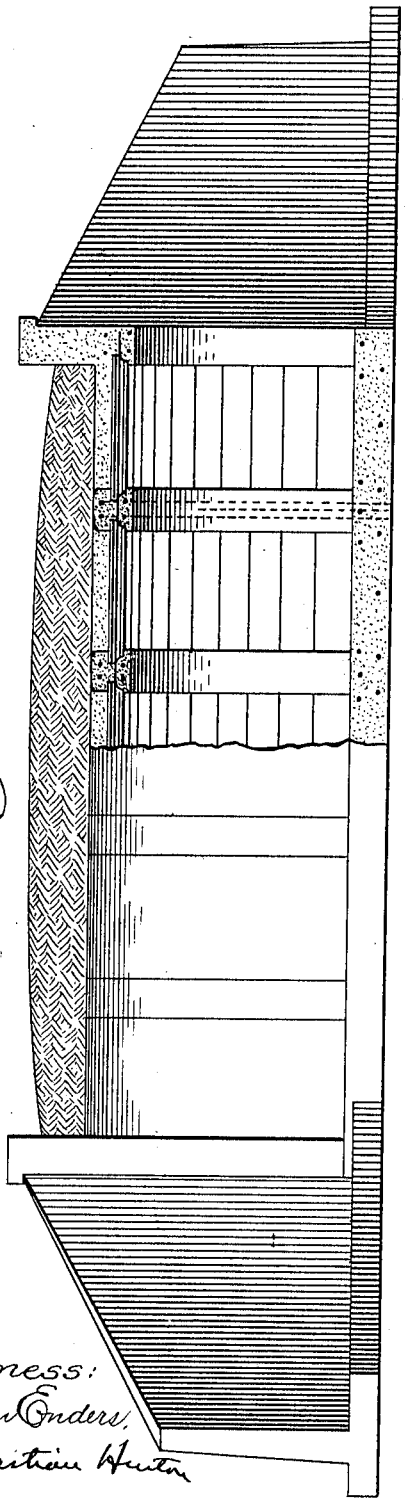
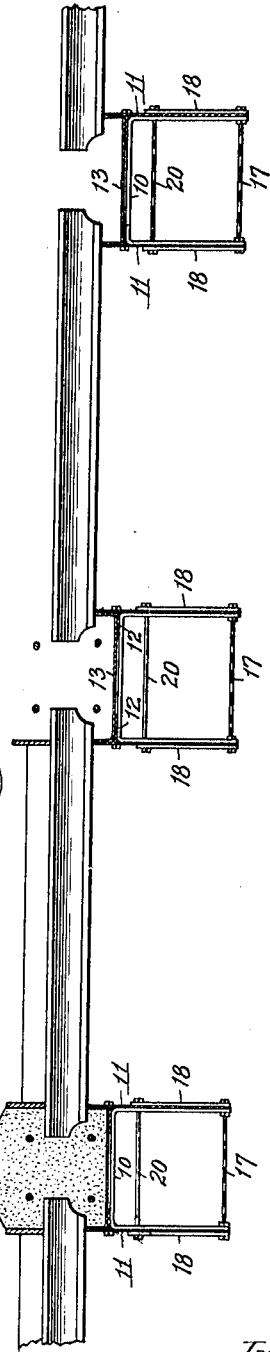

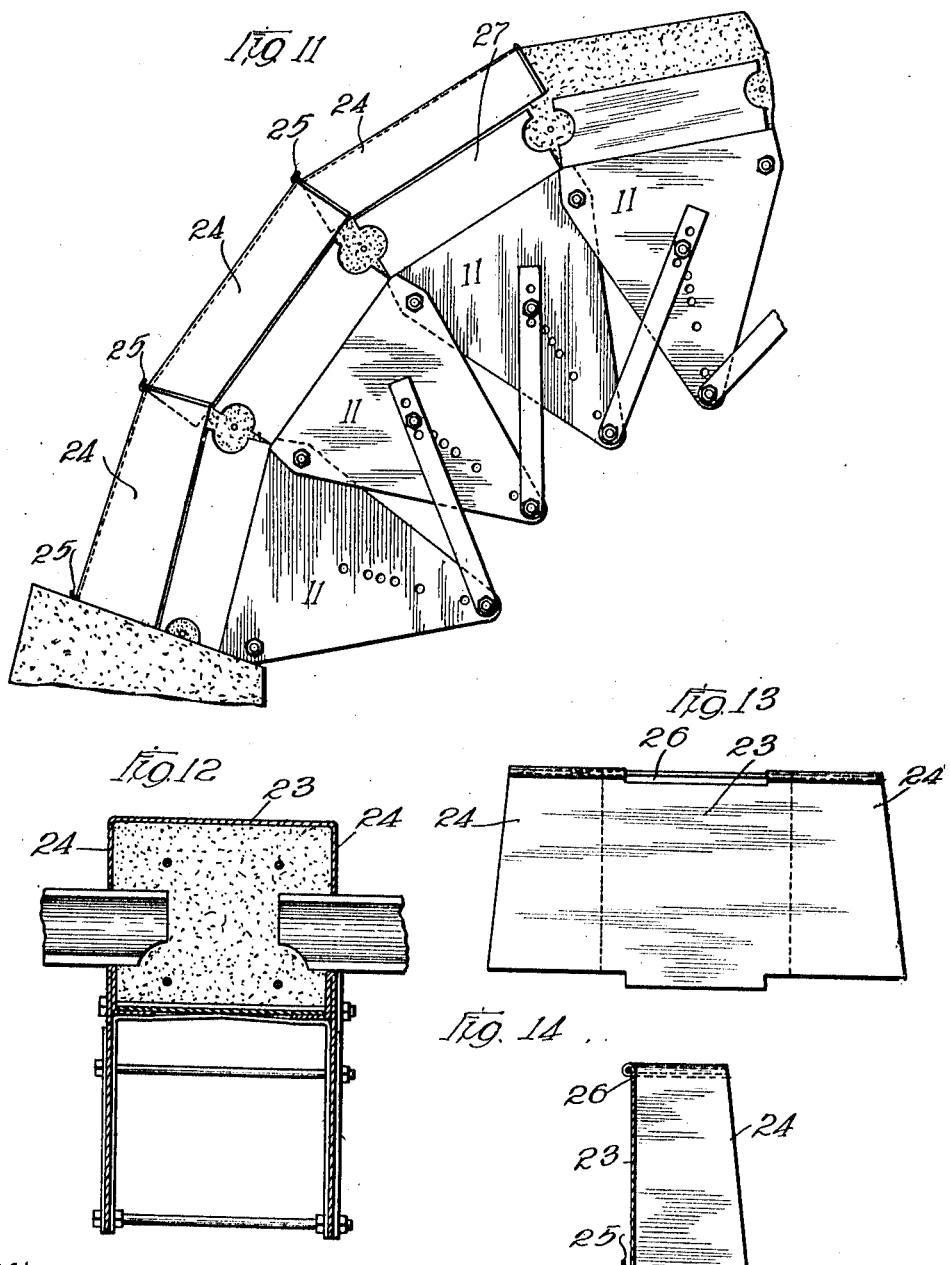

WILLIAM M. BELT AND HERSCHEL C. SMITH, OF BLOOMINGTON, ILLINOIS, ASSIGNORS, BY MESNE ASSIGNMENTS, TO AMERICAN CONCRETE FORMS COMPANY, OF BLOOMINGTON, ILLINOIS, A CORPORATION OF ILLINOIS.

CENTERING.

1,314,040.  Specification of Letters Patent.  Patented Aug. 26, 1919.

Application filed February 17, 1917. Serial No. 149,162.

*To all whom it may concern:*

Be it known that we, WILLIAM M. BELT and HERSCHEL C. SMITH, citizens of the United States, residing at Bloomington, in the county of McLean and State of Illinois, have invented certain new and useful Improvements in Centerings, of which the following is a specification.

This invention relates to centerings for arches, bridges, culverts and other concrete structures, and it is an object of our invention to provide an improved device of this kind of simple, durable and inexpensive construction which can be easily and readily collapsed and removed after the structure is formed. Another object of our invention is to provide a centering of this class so designed that it can be quickly and easily set to any arc designed within the range commonly used.

It is a further object of our invention to provide a device of this class which can be used in forming such structures of precast slabs.

It is another object of our invention to provide a molding apparatus for the ribs of composite reinforced concrete arches, serving to automatically adjust the depth of the rib to the span and rise of the arch.

The above and other features of advantages and capabilities will become apparent from a detail description of the accompanying drawings in which we have illustrated one form of our invention. The construction there shown is to be understood as illustrative only.

Figure 1 is an elevation of a centering in use embodying one form of our invention.

Fig. 2 is an enlarged detail view of a portion of the same.

Fig. 3 is a longitudinal sectional view of three of the sections.

Fig. 4 is a cross-sectional view of Fig. 3.

Fig. 5 is a plan view of several of the sections.

Fig. 6 is a detail view of one of the side members after being stamped preparatory to forming.

Fig. 7 is a detail view of the same after being formed.

Fig. 8 is a detailed view of the bottom and reinforcing member of one of the sections.

Fig. 9 illustrates a concrete arch partly in section and formed primarily of precast slabs for the erection of which our improved centering is especially adapted.

Fig. 10 is an enlarged sectional view of a portion of the same partly constructed, showing our centerings utilized for supporting the precast slabs and retaining the ribs of concrete or filling there between.

Fig. 11 is an elevation of a rib forming an attachment to be used as a part of the mold for the rib.

Fig. 12 is a cross-sectional view of Fig. 11.

Figs. 13 and 14 are elevations of the rib forming attachments in two stages of their manufacture.

Referring to the drawings in detail (see Figs. 2 to 8), each centering consists of a plurality of sections, each section comprising a reinforcing frame 10 to which are secured duplicate sides 11, each side extending upwardly beyond the top of the frame, and being bent back upon itself, and provided with an inwardly extending flange 12, designed to rest on the reinforcing frame 10. The sides are made of sheet metal and are formed by stamping the metal in the shape shown in Fig. 6 and then bending it into the form shown in Fig. 7. Resting on the frame 10 and the flanges 11 is a bottom 13, which bottom and sides are rigidly secured to the frame 10 by any suitable means, such for example as rivets or bolts. The frame 10 is secured to the sides and bottom substantially at the center thereof, each side as well as the frame to which it is secured, being provided with openings 14 near the bottom thereof, and a second set of openings 15 near the center thereof. The upper edges of the sides, which extend beyond the bottom 12, as best shown in Figs. 3, 5 and 7, are provided with openings, the center of which are in line with the bottom 13, through which openings is inserted a movable rod 16, the bottoms being so positioned as to at all times tightly engage said rod when the sections are connected. Pivotally connected to the bottom or apex of each side by means of a readily removable rod or bolt 17, is an adjusting arm 18, which arm near its upper end is provided with a plurality of openings 19 by means of which, and the openings in the sides of the sections, the centering can be accurately and readily set to any predetermined position from a straight line to any arc within the range commonly used, as will be more fully hereinafter explained.

When the centering is utilized for constructing an arch exactly as shown in Fig. 1, and after the concrete has set and it is desired to remove the centering, all that is necessary is to remove the bolt or rod 16 in one or two of the upper sections, and these sections are then allowed to slide toward each other by virtue of the slots formed by the notches 21, see Figs. 5 and 8. This causes the centering as a whole to fall away from the inner surface of the arch, for example, as shown in dotted lines in Fig. 1, after which it can be readily and quickly removed and entirely collapsed.

In Figs. 11 to 14 are illustrated a rib mold adapted to work in coöperation with the molds for the bottom of the ribs illustrated in the remaining figures, and so designed as to automatically adjust itself to produce approximately the right rib depth for any span or rise, or both, within the limits of the use of a mechanism of the character herein described. This rib mold device is designed to be laid upon the tops of the reinforced concrete slabs to accurately mold the tops of the ribs, which project up between these slabs. It comprises a plurality of sections substantially U-shaped in cross section, although of course, the cross section may be varied, pivotally connected at their ends and progressively increasing in size. These rib molds are made from metal blanks, such as illustrated in Fig. 13, having tops 23 and sides 24, which are bent on the dotted line shown in Fig. 13, and provided with hooks 25 at one end and apertures or slots 26 formed by securing a rod across a notch at the other end, so that the sections may be removably pivoted together. The slot 26 may obviously be formed in other ways if desired.

The first or smallest of these rib molds is bridged over the subjacent reinforcing concrete slabs preferably substantially at the point in the arch (indicated by 27,) where the slope is such as to necessitate some support for the top of the soft concrete rib projecting upwardly between the adjacent slabs. The next larger rib mold is hooked on below the first, and so on down to the abutment of the arch. It will be readily apparent that the increasing height of the rib molds applied to the tops of the concrete slabs, will result in a progressively deeper though smooth topped arch rib down the sides of the arch, and that the deepening of the arch rib may be begun wherever desired, but it is preferably begun at a point near the crown of the arch where the slope begins to be steep enough to necessitate some support for the top of the soft arch rib, and continues down to the abutment so as to provide approximately the right depth of rib for each kind and dimension of arch. This device makes it unnecessary to calculate carefully the correct rib strength for each arch, automatically providing a rib strong enough to carry the arch by the use of the arch rib molds. Of course, where markedly different types of arches are concerned, it is desirable to have different rib dimensions, but this may be effected with the rib set shown by merely beginning the series with a deeper section or with a shallower section so as to provide a deeper or shallower rib according to the type of bridge. But in the ordinary arch constructions one set will give approximately the correct arch rib dimensions for all arches without changing the first section. In actual practice a definite number of sections will be specified for arches of each size, so that all the workman need do is to set up three, four, or other specified number of sections, and is relieved from both guess work and calculation.

Having now described our invention, we claim:—

1. A rib centering for concrete arch comprising a plurality of sections having bottom plates to form the mold bottoms for said ribs, said sections pivotally connected together by removable bolts to form arch rib rings, and means to permit certain of said sections to move toward each other, when the corresponding bolts are removed to permit the partial collapse of the arch ring and its ready removal.

2. A centering for an arch rib comprising a plurality of connected mold sections having bottoms and sides adapted to be set up to form a rigid arch rib ring, and means to effect the partial collapse of said arch rib ring.

3. A rib center for concrete arch comprising a plurality of sections pivotally connected together to form an arch rib ring, and means to permit two of said sections to slide toward each other to partially collapse said arch rib ring to permit the removal thereof from the completed arch.

4. An arch rib center for concrete arch comprising a plurality of sections, each having a bottom portion adapted to form a bottom mold for an arch rib, bolts pivotally connecting said sections, the ends of said bottoms abutting said bolts, portions of said sections being cut away to permit adjacent sections to slide toward each other upon removal of the bolts to permit the partial collapse of the arch rib ring for the purpose specified.

5. A centering for an arch rib comprising a plurality of sections, pivotally connected together by bolts and having bottoms and sides, said bolts passing through said sides, and slots in certain of said sections of sufficient length to permit adjacent sections to move toward each other upon removal of said bolts, to partially collapse the arch rib ring.

6. A centering for arches, comprising a plurality of sections, pivotally connected together and having rib forming bottoms, and removable members holding said sections in fixed relation to each other and against which the ends of said bottoms abut, certain of said sections being adapted to move toward each other upon removal of said members to partially collapse the centering and permit its ready removal.

7. A centering for arch ribs comprising a plurality of sections connected together, each section comprising a bottom and two sides extending upwardly therefrom, said sides above said bottom being free from bolts, rivets or other projections, said sections being adapted to be formed into a rigid arch mold having substantially continuous bottom and sides.

8. An arch rib ring comprising a plurality of sections connected together, each section comprising two sides bent back upon themselves and then inwardly to afford a seat for a bottom, a bottom secured to the inwardly bent portions of said two sides, the portion of the sides above the bottom being free from projections, such as bolts, rivets, or the like.

9. An arch rib centering comprising a plurality of sections pivotally connected together, each section comprising two sides constructed of sheet metal partially bent back upon itself, bottoms between said bent back portions of said sides, and bolts passing through said bent back portions of said sides to pivotally connect adjacent sides, and means to hold said bottoms against tilting relative to said sides.

10. An arch rib centering comprising a plurality of sections pivotally connected together, each section comprising two sides constructed of sheet metal partially bent back upon itself, bottoms between said bent back portions of said sides, and bolts passing through said bent back portions of said sides to pivotally connect adjacent sides together, the plane of said bottoms passing substantially through the center of said bolts, whereby the distance between the edges of adjacent bottoms will not be varied by the pivotal movement of said sections on said bolts, and means to hold said bottoms against tilting relative to said sides.

11. An arch rib ring comprising a plurality of sections, each section consisting of two sides, and a bottom between said sides but below the upper edges thereof, the portion of said sides between said bottom and said upper edges being smooth, a reinforcing member affixed to said sides and adapted to support said bottom, and a plurality of apertures through said reinforcing member and said sides for adjustably mounting said section.

12. An arch center comprising a plurality of sections, having sides and bottom portions, the bottom portions being connected to said sides below the top edges of said sides, the portion of said sides between said bottom portions and said edges being smooth, said sections being adapted to be formed into a rigid arch mold having substantially continuous bottom and sides, substantially as described.

13. An arch rib ring comprising a plurality of sections, having sides and bottom portions, said sides extending below said bottom portions, said sections being adapted to be pivotally connected together by bolts passing through the overlapped sides of the two adjoining sections, said bolts being adapted to form a closure between the adjoining bottom edges of said adjoining sections.

14. An arch rib ring comprising a plurality of sections, each consisting of a bottom portion and sides extending above and below it, bolts pivotally connecting the overlapped sides of two adjoining sections and slots arranged to permit said sections to move toward each other across the line of their pivotal connection upon removal of said bolts.

15. An arch centering comprising a bottom piece, side pieces connected thereto, and extending upwardly and downwardly therefrom, a U-shaped reinforcing iron between said sides below said bottom, apertures in said reinforcing iron and said sides, and means to be selectively brought into registry with said apertures to permit adjustment of said centering.

16. An arch rib center comprising a plurality of sections pivotally connected together and comprising portions to form the bottom for arch rib molds and portions depressed depending below said bottoms, links adjustably connecting said depending portions, and a plurality of apertures in said links and sections adapted to be selectively brought into registry to effect a plurality of dimensions of an arch ring without measurement or calculation.

17. A mold for rib portions of concrete arches, comprising a main body and sides of gradually increasing width whereby to mold said portions progressively deeper down the slope of the arch.

18. A mold for rib portions of reinforced concrete arches, comprising a plurality of sections, each having a main body and sides of gradually increasing width whereby to form a progressively deeper rib section of a rib portion.

19. A mold for rib portions of concrete arches, comprising a plurality of sections substantially U-shaped in cross-section, progressively increasing in depth and adapted to be connected together, whereby portions of varying depth may be made to reinforce arches of varying dimensions.

20. The method of molding arch rib portions, which consists in applying a sectional rib mold (at a predetermined point) on the haunch of the arch, and applying progressively deeper mold sections below said first section filling the sections with concrete.

In witness whereof, we hereunto subscribe our names to this specification in the presence of two witnesses.

WILLIAM M. BELT.
HERSCHEL C. SMITH.

Witnesses:
SEBASTIAN HINTON,
C. I. SHERMAN.

Copies of this patent may be obtained for five cents each, by addressing the "Commissioner of Patents, Washington, D. C."

It is hereby certified that in Letters Patent No. 1,314,040, granted August 26, 1919, upon the application of William M. Belt and Herschel C. Smith, of Bloomington, Illinois, for an improvement in "Centering," errors appear in the printed specification requiring correction as follows: Page 3, line 107, claim 16, after the word "comprising" insert the word *depressed;* same page and claim, lines 108-109, strike out the word "depressed"; and line 112, after the word "adapted" strike out the semicolon; same page, line 129, claim 19, after the word "substantially" strike out the comma; and that the said Letters Patent should be read with these corrections therein that the same may conform to the record of the case in the Patent Office.

Signed and sealed this 30th day of September, A. D., 1919.

[SEAL.]

M. H. COULSTON,
*Acting Commissioner of Patents.*

Cl. 25—131.5.